United States Patent
Tran et al.

(10) Patent No.: US 6,997,974 B2
(45) Date of Patent: Feb. 14, 2006

(54) HIGH STRENGTH AND ULTRA-EFFICIENT OIL COALESCER

(75) Inventors: Trung N. Tran, Torrance, CA (US); Tom Iles, Rancho Palos Verdes, CA (US); Christopher L. Scott, Los Alamitos, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/990,092

(22) Filed: Nov. 15, 2004

(65) Prior Publication Data

US 2005/0193889 A1    Sep. 8, 2005

Related U.S. Application Data

(62) Division of application No. 10/325,201, filed on Dec. 20, 2002.

(51) Int. Cl.
*B01D 46/00* (2006.01)
*B01D 39/16* (2006.01)
*B01D 39/20* (2006.01)

(52) U.S. Cl. ............................ 95/273; 95/284; 95/286; 55/319; 55/423; 55/424; 55/428; 55/487; 55/498; 55/503; 55/510; 55/523; 55/525; 55/528; 55/DIG. 5; 55/DIG. 17; 55/DIG. 25; 428/458; 428/473.5; 428/474.4; 264/258

(58) Field of Classification Search .............. 55/319, 55/385.1, 385.3, 423, 424, 428, 486, 487, 55/495, 498, 503, 510, 523, 525, 527, 528, 55/DIG. 5, DIG. 17, DIG. 25; 95/273, 284, 95/286; 428/332, 458, 473.5, 474.4, 474.5; 264/258, 280, 294
See application file for complete search history.

(56) References Cited

U.S. PATENT DOCUMENTS

| | | | | |
|---|---|---|---|---|
| 3,724,670 | A | * | 4/1973 | Gernhardt .............. 210/497.01 |
| 3,891,417 | A | * | 6/1975 | Wade .......................... 55/487 |
| 4,160,684 | A | * | 7/1979 | Berger et al. ................. 55/487 |
| 4,366,054 | A | | 12/1982 | Kronsbein |
| 4,759,782 | A | * | 7/1988 | Miller et al. .................. 55/487 |
| 4,818,257 | A | | 4/1989 | Kennedy et al. |
| 4,925,466 | A | * | 5/1990 | Overby ........................ 55/319 |
| 5,013,438 | A | | 5/1991 | Smith |
| 5,045,094 | A | * | 9/1991 | Paranjpe ...................... 95/273 |
| 5,362,406 | A | * | 11/1994 | Gsell et al. ................. 210/767 |
| 5,409,514 | A | * | 4/1995 | Ragusa et al. ............... 55/319 |
| 5,605,748 | A | * | 2/1997 | Kennedy et al. ............. 55/486 |
| 5,665,131 | A | | 9/1997 | Hock et al. |
| 5,716,423 | A | | 2/1998 | Krul et al. |
| 5,795,369 | A | * | 8/1998 | Taub ........................... 95/273 |
| 6,096,117 | A | | 8/2000 | Lisson et al. |
| 6,146,436 | A | | 11/2000 | Hollingsworth et al. |
| 6,387,143 | B1 | * | 5/2002 | Adiletta ........................ 55/527 |
| 6,537,339 | B2 | * | 3/2003 | Schmitz et al. .............. 55/498 |
| 2004/0194624 | A1 | * | 10/2004 | Ohya et al. .................. 95/273 |

* cited by examiner

*Primary Examiner*—Jason M. Greene
(74) *Attorney, Agent, or Firm*—Oral Caglar, Esq.

(57) ABSTRACT

A coalescing assembly for coalescing entrained oil from a high temperature, high velocity gas stream comprises a coalescing element of compacted high temperature polyamide fibers, such as those available under the trademark Nomex®, rigidly held by concentric cylindrical support structures of a dense fibrous material such as stainless steel. The coalescing assembly forms a component of an oil coalescer having a unique hole configuration in its outer shell to prevent coalesced oil from being re-entrained into the gas stream. The oil coalescer is a component of an oil separator for use in aircraft operational environments and features high durability and longevity of 10 years or more.

33 Claims, 5 Drawing Sheets

HIGH STRENGTH AND ULTRA-EFFICIENT OIL COALESCER

CROSS REFERENCE TO RELATED APPLICATION

This application is a divisional of U.S. application ser. No. 10/325,201, filed Dec. 20, 2002.

GOVERNMENT RIGHTS

This invention was made in the performance of work under a government funded research and development program, F-22 ARS, under contract number F33657-91-C-0006 to Boeing Military Aircraft and is subject to the provisions of that contract. The United States Government may have certain rights to this invention.

BACKGROUND OF THE INVENTION

The present invention relates to the field of filtration and, in particular, to ultra-efficient filters, separators, and coalescers for separating entrained aerosols from a gas flow.

Certain gas streams, such as blow-by gases from piston compressors found in air recharge systems typically found in aircraft, carry substantial amounts of oils entrained therein, in the form of an aerosol. These oils are required to lubricate the piston compressor to ensure its long life operation. The majority of the oil droplets within the aerosol range in size from 0.1 microns to 5.0 microns. Coalescence methods using fibrous filters are generally used to remove this oil-based aerosol. Such methods rely on the following physical mechanism: (1) interposing a fibrous filtration means into a gas stream containing the aerosol so that the aerosol droplets are allowed to approach the fibers, (2) attachment of the droplets to the fibers, (3) coalescence of attached droplets on the fiber so as to create enlarged droplets, and (4) release of enlarged droplets to a collection area under the influence of gravity or centrifugal force when their weight exceeds a certain threshold.

Coalescent filters contain fibers, structured with various pore sizes, that are adherent to the aerosol. These filters are sometimes combined with a particle filter and a separator, such as an oil separator, to remove contaminant particles from the stream or to remove oils present in the gaseous stream for return to the sump of the piston compressor for reuse as lubrication. Additional filters that can be used include composite fiber-mesh filters and the like. Mesh filters contain fibers of, for example, polyester, polypropylene, nylon, Teflon, Nomex®, Viscose, or combinations of these materials. These fibers have a variety of pore sizes and are commercially available. Nomex® is a registered trademark of E. I. du Pont de Nemours and Company, Wilmington, Del. It is a polyamide in which all the amide groups are separated by meta-phenylene groups; that is, the amide groups are attached to the phenyl ring at the 1 and 3 positions.

Aircraft environments present a special set of problems for such oil coalescers. Cabin air is generally obtained from the blow-by air stream from the turbine engines propelling the aircraft. This air stream is extremely hot, has a high velocity, and contains an aerosol of oil and other contaminants produced by the turbine engine or by auxiliary compressor components. Removal of contaminants from such an air stream imposes unique requirements upon filtration and conditioning systems therefor, and in particular, upon oil coalescer devices.

U.S. Pat. No. 6,355,076, issued to Gieseke et al., discloses an oil separation and coalescing apparatus for removing entrained oils from an aerosol. It comprises a first coalescer filter with a non-woven media of fibers having a panel construction and a second coalescer filter with a pleated construction. It is designed for applications with diesel engines such as those typically found in trucks. Its temperature and gas velocity limitations are those typically found in trucks and not in aircraft environments, and more specifically, in aircraft piston compressors.

Oil coalescers, such as those made, for example, by Micro-Filtration, Inc., a subsidiary of Numatics, headquartered in Lapeer, Mich., are typically used to remove contaminants from gas streams. Such oil coalescers have been shown in testing to be unable to withstand the pressures resulting from high velocity gas streams, resulting in the disintegration of the coalescing element, i.e., filter; the particles of the disintegrated oil coalescer element are swept downstream of the oil coalescer to clog other system components and ultimately cause them to fail. They do not exhibit the structural integrity necessary to withstand the decompression rates and high temperatures present in the aircraft operational environment. Furthermore, the oil removal efficiency of these fiber-porous coalescers is only about 90% to 95%. It is desirable to attain an ultra-efficiency of 97% or higher for oil coalescers in an aircraft environment.

Oil coalescers currently used in aircraft air conditioning systems are typically bulky and have a moderate oil removal efficiency of 75%–85%. Such efficiency becomes more difficult to attain, as the coalescer becomes more compact. Because of the premium placed on space in an aircraft, it is desirable that the oil coalescer be light and compact, in order to augment operational efficiency of the aircraft and allow it to carry more equipment. Finally, a long service life of 10 years or more is desirable since it reduces the maintenance requirements for the aircraft piston compressor, making it cheaper to operate.

As can be seen, there is a need for an oil coalescer for use in an aircraft piston compressor for the removal of entrained aerosols from a high velocity gas, where the coalescing element is ultra-efficient (i.e. oil removal efficiency in excess of 97%) and vibration resistant. It is also desirable to provide an oil coalescer that is compact, has a long service life, and rugged enough to endure a continuous pressure presented by a high velocity gas stream and the decompression rates found in the aircraft's operational environment.

SUMMARY OF THE INVENTION

In one aspect of the present invention, a coalescing assembly for removing entrained oil from a gas stream is provided. The coalescing assembly comprises a coalescing element made of one or more layers of compacted, high temperature polyamide fibers.

In another aspect of the present invention, an oil coalescer is provided for removing entrained oils from a high velocity, high temperature gas stream. The inventive oil coalescer comprises a cylindrical coalescing element of compacted high temperature polyamide fibers held in a compacted state by a support structure comprised of a cylindrical, concentric inner and outer fiber-metal sleeves enclosing the coalescing element therebetween. The coalescing element with its support structure is encased by a cylindrical shell, a top cap, and a bottom cap. The cylindrical shell has holes along its lower periphery to allow the gas stream to escape the coalescer without entraining oils that have already been removed, and the bottom cap has holes permitting coalesced oil to drain from the oil coalescer. The oil coalescer also features a diverging channel directing the gas stream through an orifice in the top cap into the inner area, and thereby reducing its velocity by means of adiabatic expansion.

In still another aspect of the present invention, a method for compacting a polyamide felt is given, the method comprising the steps of preparing a rectangular strip of felt by tapering the ends thereof; compacting the rectangular strip; heating the compacted rectangular strip; allowing the compacted rectangular strip to cool; assembling the compacted rectangular strip into a cylindrical assembly; compacting the cylindrical assembly; and heating the compacted cylindrical assembly.

In yet another aspect of the invention, an ultra-efficient coalescing element is provided which is comprised of compacted high temperature polyamide fibers such as those available under the trademark NOMEX (aramid fiber) and KEVLAR from DuPont. The coalescing element is preferably comprised of three layers of Nomex® felt, each layer having an uncompacted thickness of 0.25", the three layers being compacted to a total thickness of 0.25".

In still another aspect of the invention, a method is provided for coalescing oil from a high velocity, high temperature gas stream, the gas with an entrained aerosol, flowing through a channel, which comprises the steps of reducing the velocity of the gas stream by adiabatic expansion through a diverging channel, directing the gas stream to an oil coalescer comprising a coalescing element supported by a rigid support structure, directing the gas stream through the coalescing element, collecting the removed aerosol material within the oil coalescer for removal from the channel, and allowing the purified gas flow to continue through the channel.

These and other features, aspects and advantages of the present invention will become better understood with reference to the following drawings, description, and claims.

DETAILED DESCRIPTION OF THE INVENTION

Figure 1:
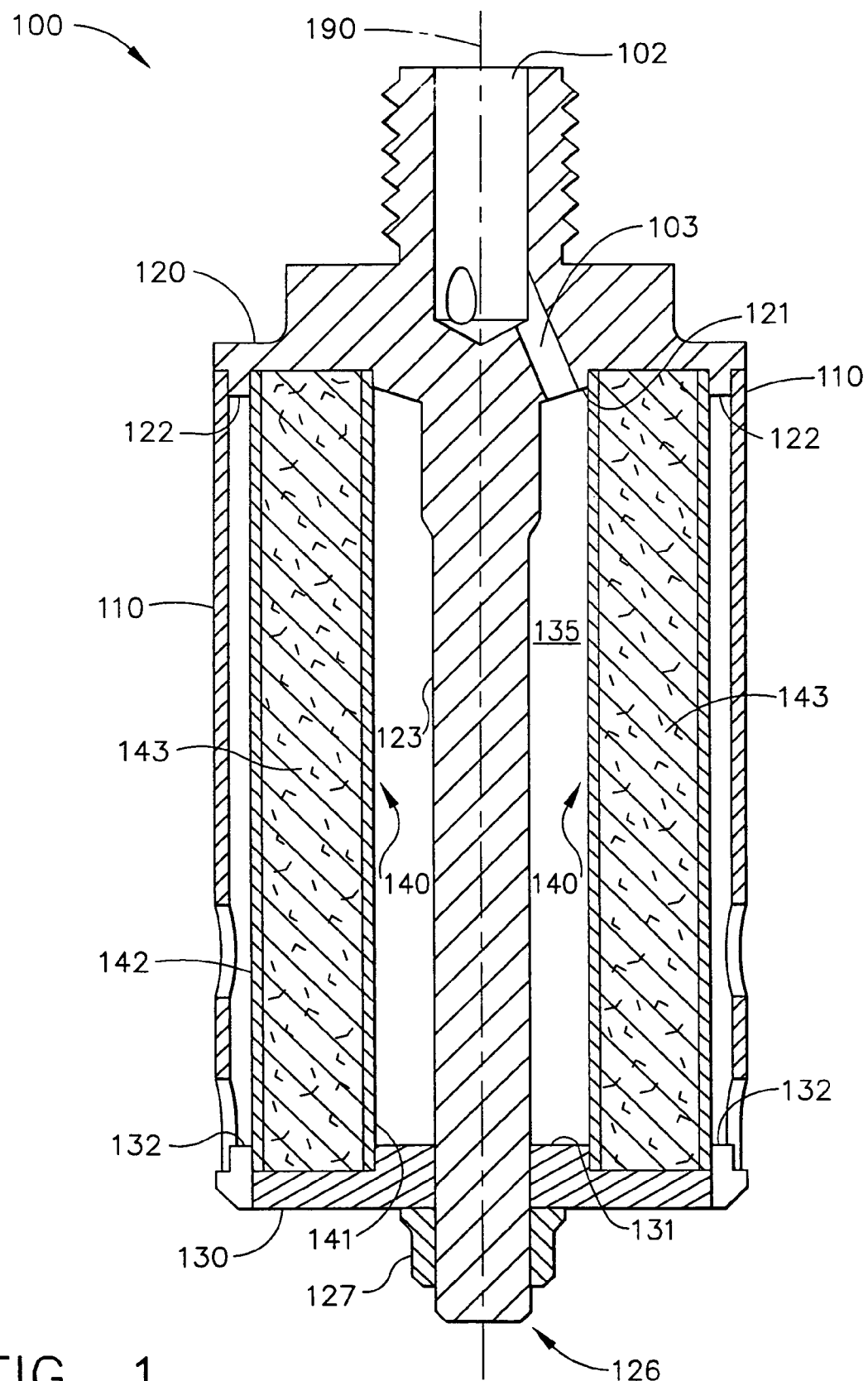
FIG. 1 shows a cross sectional view of an oil coalescer, according to an embodiment of the invention.

The following detailed description shows the best currently contemplated modes of carrying out the invention. The description is not to be taken in a limiting sense, but is made merely for the purpose of illustrating the general principles of the invention, since the scope of the invention is best defined by the appended claims.

The invention provides a high-strength ultra-efficient oil coalescer that separates an entrained oil in the form of an aerosol from a high-velocity gas stream. The inventive oil coalescer combines the strength of stainless-steel fibers and the coalescing efficiency of Nomex® felt into comprising a coalescing element and a support element having support structures. The coalescing element may be comprised of highly porous, compacted Nomex® felt sandwiched between support structures preferably comprised of two concentric, coaxial cylinders. The cylinders are constructed of a durable material of dense, woven fibers such as stainless steel. As an example, three layers of 0.25" thick Nomex® felt (for a total thickness of 0.75") are compacted into a 0.25" space between the two cylindrical support structures to provide a Nomex® density that may be higher than normal and to increase the oil retention efficiency of the coalescing element. Oil separation may be achieved by reducing the velocity of the aerosol-laden air stream and directing it from the inside of the integral stainless-steel/Nomex® coalescer assembly to the outside of the coalescer assembly, thereby allowing the aerosol of entrained oil droplets to come in contact with the Nomex® fibers. The oil removed from the gas stream by coalescence collects at the bottom of the oil coalescer and purified air exits through openings in the housing surrounding the oil coalescer. The collected oil may be drained through unique optimum slot openings between the support core and the bottom cap surrounding the oil coalescer. This compact and integral oil coalescer provided by the invention has been shown to have an oil removal efficiency of 97.5%, with the support structure providing sufficient strength to sustain the high vibration and depressurization levels found in an aircraft operational environment.

The oil coalescer of the present invention exhibits a number of inventive improvements over the prior art. First, previous oil coalescer devices allowed a certain amount of coalesced oil to be re-entrained into the gas stream, which reduced the efficiency of the device. The oil coalescer of the present invention has a unique design built into the bottom cap and cylindrical shell to maximize the oil flow to the drain and to prevent the oil from returning to the purified airflow by means of entrainment. Second, existing coalescing filters were tested under the conditions found in the aircraft environment and were found to lack both the durability to withstand high velocity gas streams having pressures of 5,380 psig and the ability to withstand temperatures in the general range of 400° F. to 450° F. without disintegrating and introducing debris into the system. The inventive use of Nomex® as the coalescing element in the present invention coupled with the durable support structure that orients the coalescing element to the gas stream has been shown to have the required durability. Third, the efficiency for prior art oil coalescers for the removal of aerosols of entrained oils was only about 90% to 95%. The novel use of compacted Nomex® has been shown to exhibit oil removal efficiencies in excess of 97.5% and has not been described or suggested by the prior art.

Directing attention now to FIG. 1, a side cross-sectional view of an embodiment of the oil coalescer 100 is shown. Oil coalescer 100 may comprise a shell 110 with top cap 120 and bottom cap 130. A central shaft 123 may be integral to and extend downwardly from top cap 120. A chamber 102 for receiving an incoming gas stream may be axially positioned in the upper end of central shaft 123, with the chamber 102 in fluid communication with the internal cavity 135 by one or more nozzles 103 radially located about the lower end of chamber 102. The distal end 126 of central shaft 123 may be threaded to receive a lock nut 127, so that the shell 110 may be captured between top cap 120 and bottom cap 130 when lock nut 127 is tightened against bottom cap 130. Lock nut 127 may be easily loosened to remove the bottom cap 130 and allow the coalescing assembly 140 to be inserted into the internal cavity 135 within shell 110. To prevent leak paths, high temperature sealant, such as Loctite® 272, may be applied to seal both ends of the coalescing assembly 140 to the two end caps 120, 130 and in between bottom cap 130 and central shaft 123. Loctite® is a registered trademark of Loctite Corporation.

A coalescing assembly 140 may be a cylindrical assembly having a diameter less than that of shell 110, to allow coalescing assembly 140 to be inserted within shell 110, with central shaft 123 extending through coalescing assembly 140. The coalescing assembly 140 may be comprised of an inner support structure 141 surrounded by an outer support structure 142, the support structures 141, 142 sandwiching a coalescing element 143 therebetween. A top flange 122 can extend downwardly from the lower surface 121 of top cap 120. Top flange 122 may be circular and centered around centerline 190. A bottom flange 132 can extend upwardly from the upper surface 131 of bottom cap 130. Bottom flange 132 may also be circular and centered around centerline 190. The flanges 122,132 oppose each other and can be configured to snugly receive the outer support structure 142 and the shell 110, keeping both axially aligned and centered about centerline 190.

Coalescing element 143 may be comprised of polyimide or polyamide fibers compacted according to the invention and described herein, and preferably of Nomex® fibers comprised of a polyamide having amide groups separated by meta-phenylene groups, i.e. the amide groups are attached to the phenyl ring at the 1 and 3 positions. It has been found that compacted Nomex® fibers, as opposed to uncompacted Nomex™ fibers normally supplied as Nomex® felt, can increase the efficiency of the oil coalescing assembly to remove aerosol of entrained oil from the gas stream. One or more layers of Nomex® felt can be compacted by heat compression methods, as further described below, and maintained in a compacted state by the sandwiching action of the support structures 141, 142. As an example, three layers of 0.25" thick Nomex® felt (for a total thickness of 0.75") are compacted into a 0.25" space between support structures 141, 142, to provide a Nomex® density that may be higher than normal and to increase the oil retention efficiency of the coalescing element 143.

Support structures 141, 142, can provide the functions of pre-filtering large particles from the gas stream and of rigidly supporting coalescing element 143 so that coalescing element 143 may withstand the pressures exerted by the high velocity gas stream exerting pressures in excess of 5000psig as the stream is directed across the coalescing element 143, as well as the vibration levels experienced in an aircraft environment. Each support structure 141, 142 may be constructed of a durable material, such as stainless steel, in the form of a dense, permeable, and fibrous material, for containing the coalescing element 143 between the support structures in the presence of the previously described high internal pressures tending to force the gas stream outwardly from the internal cavity 135.

The dense fibrous material from which the support structures 141, 142 are formed may be advantageously comprised of raw metal fibers, such as stainless steel, having a typical length to diameter ratio of approximately 90:1. The raw metal fibers may be felted into sheets and vacuum sintered to form diffusion bonds between the fibers, so that the fibers are in a semi-rigid matrix so that they may easily be cut to size. Such material obtained from Technetics Corporation, DeLand, Fla., can be used in this application and exhibits screen properties of 18 mesh (a "mesh" is a measurement typically used in filtration applications and indicates that an equivalent screen having 18 strands per inch in two orthogonal directions will have the same filtering properties as the material being measured.) The sintered metal fibers comprising support structures 141, 142 have sufficient strength to support the coalescing element 143 against a high velocity gas stream so that the coalescing element 143 maintains its integrity and does not disintegrate under high pressure rapid decompression.

Figure 5:
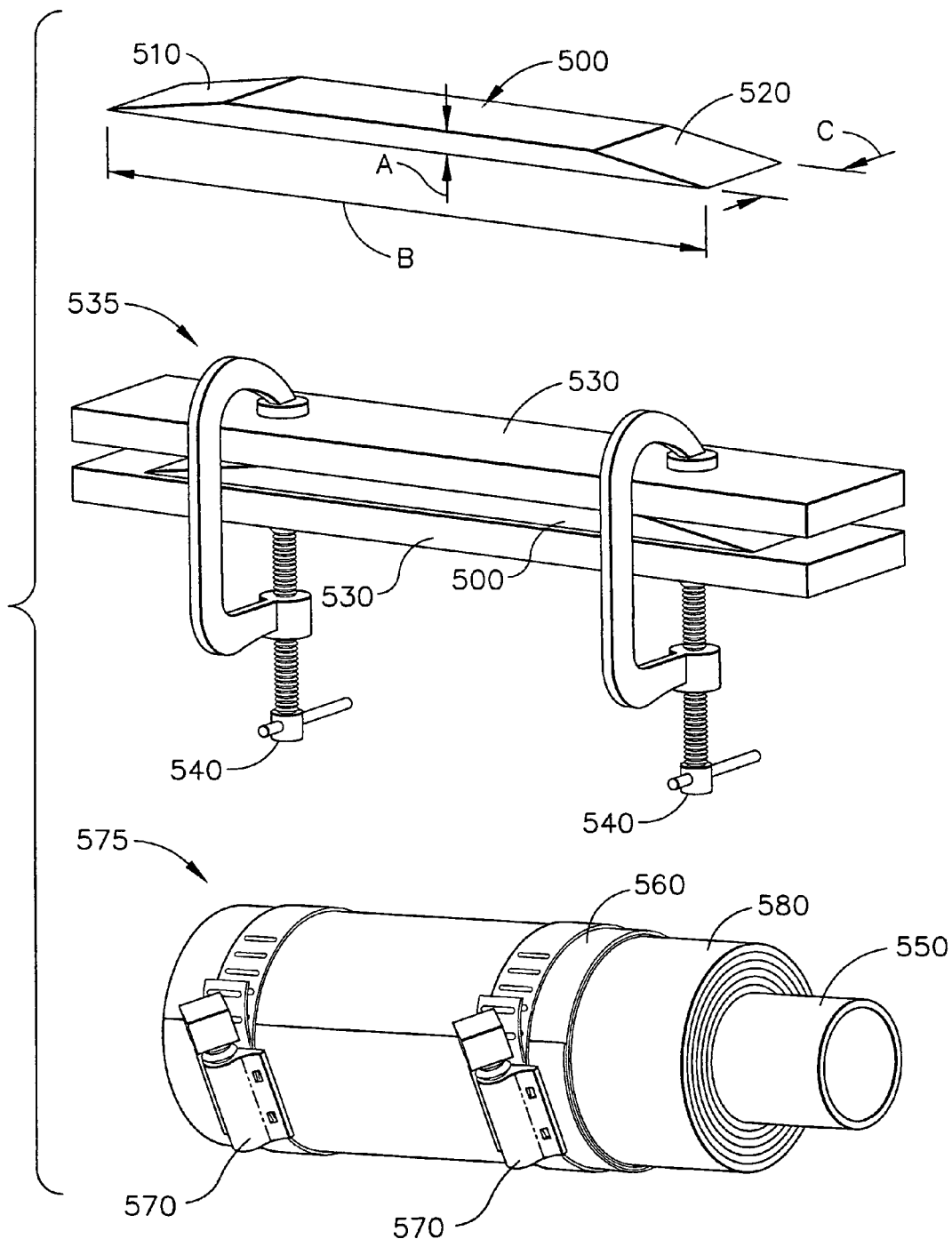
FIG. 5 illustrates the manner in which the Nomex® felt is compacted to the desired thickness.

An exemplary method for compacting the Nomex® felt to the desired thickness is illustrated in FIG. 5. A generally rectangular-shaped strip 500 having a width C generally the same as that of the coalescing assembly may be cut from a piece of Nomex®) felt having a thickness of approximately 0.25" (A) and both ends 510, 520 of the strip 500 are sanded to gradually taper the ends so that it may conform more easily to a cylindrical shape when rolled. Next, the rectangular strip 500 may be compacted between two metal plates 530 to a thickness of approximately 0.083", as an example, and held to that thickness by C-clamps 540 or any other appropriate means. The assembly 535 comprised of the compacted strip 500 as held by the metal plates 530 may be placed in an oven for a minimum of 4 hours at a temperature of 250° F.±10° F. The assembly 535 may be allowed to cool in the oven in the presence of dry air until the temperature of the assembly 535 reaches a temperature of 120° F. or lower, at which time the C-clamps 540 and metal plates 530 are removed from the now compacted strip 500. Before the compacted strip 500 is allowed to cool further, and preferably within 10 minutes or less, the compacted strip 500 may be tightly wrapped around a tube 550 having a 0.5" OD, as an example, or similar cylindrical support structure, until three layers are achieved. The wrapped strip 500 may then be covered with a copper sheet 560 held around the wrapped strip 500 by hose clamps 570 or similar devices. The hose clamps 570 are then tightened gradually and equally until the diameter of the wrapped strip 500 and copper sheet 560 assembly 575 achieves a diameter of between 1.00" and 1.05". The assembly 575 may be returned to the oven where it may again be heated to 250° F.±10° F. and held at that temperature for another 4 hours minimum. At the end of this time, the assembly 575 may be allowed to cool in the oven in the presence of dry air until the temperature of the assembly reaches 120° F. or lower. At this point, the now cylindrical strip 500 should be removed from the copper sheet fixture and immediately assembled between the two inner and outer cylindrical support structures within approximately four hours removal of the copper sheet fixture from the oven; otherwise, it may begin to expand to its original uncompacted shape.

Figure 2:
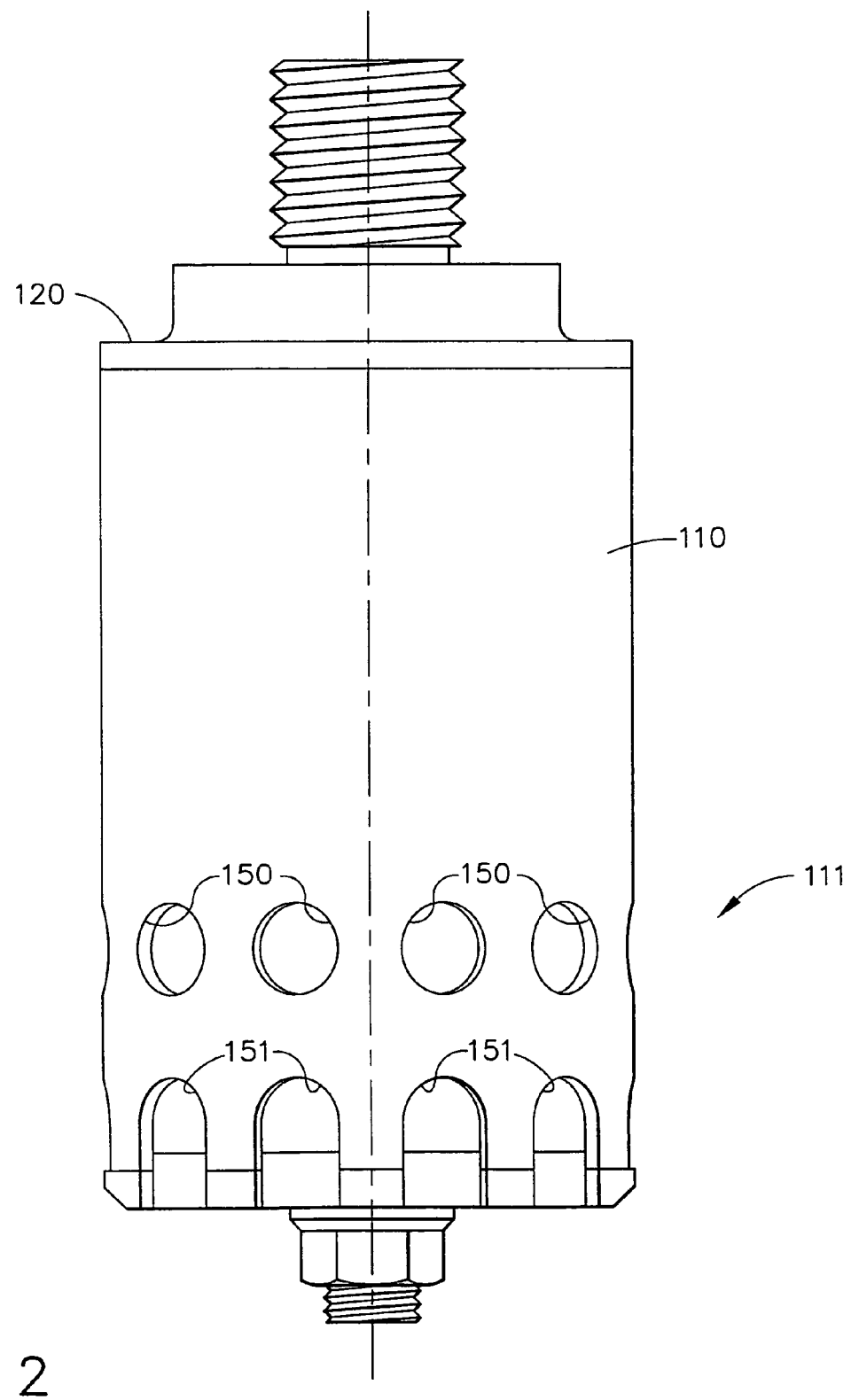
FIG. 2 shows the external side view of an oil coalescer, according to an embodiment of the invention.
Figure 3:
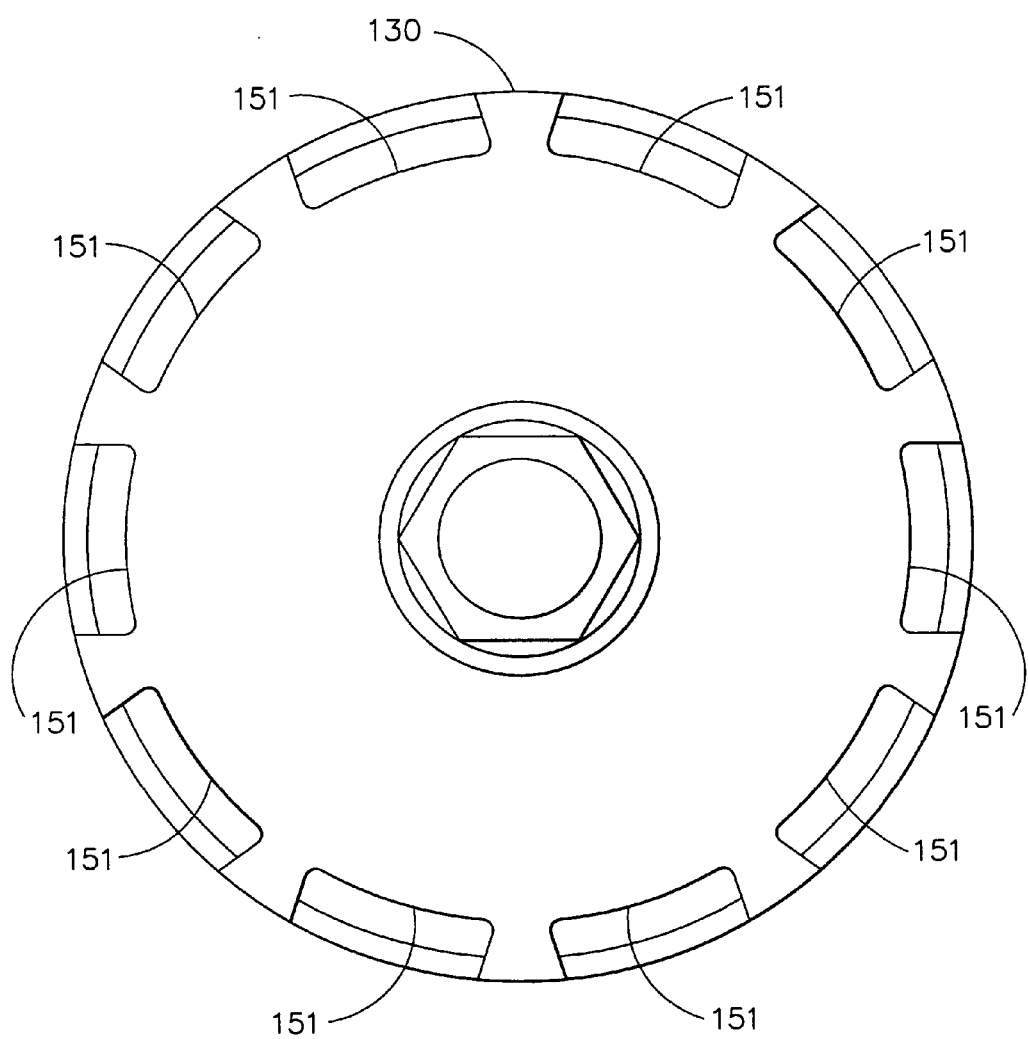
FIG. 3 shows a bottom view of an oil coalescer, according to an embodiment of the invention.

The shell 110, as illustrated in FIG. 2, can have two rows of holes, one row of holes 150 entirely along the circumference of shell 110 and another row of holes 151 partially on the circumference and partially on the bottom cap (FIG. 3), both rows situated along the lower portion 111 of shell 110. Ordinary filter and coalescer assemblies have holes along the entire surface area of the outer shell. It has been found that having holes only along the lower portion 111 of the shell 110 advantageously prevents coalesced oil from being re-entrained into the gas stream, while at the same time allowing the coalesced oil to be removed through the lower row of holes 151.

Figure 4:
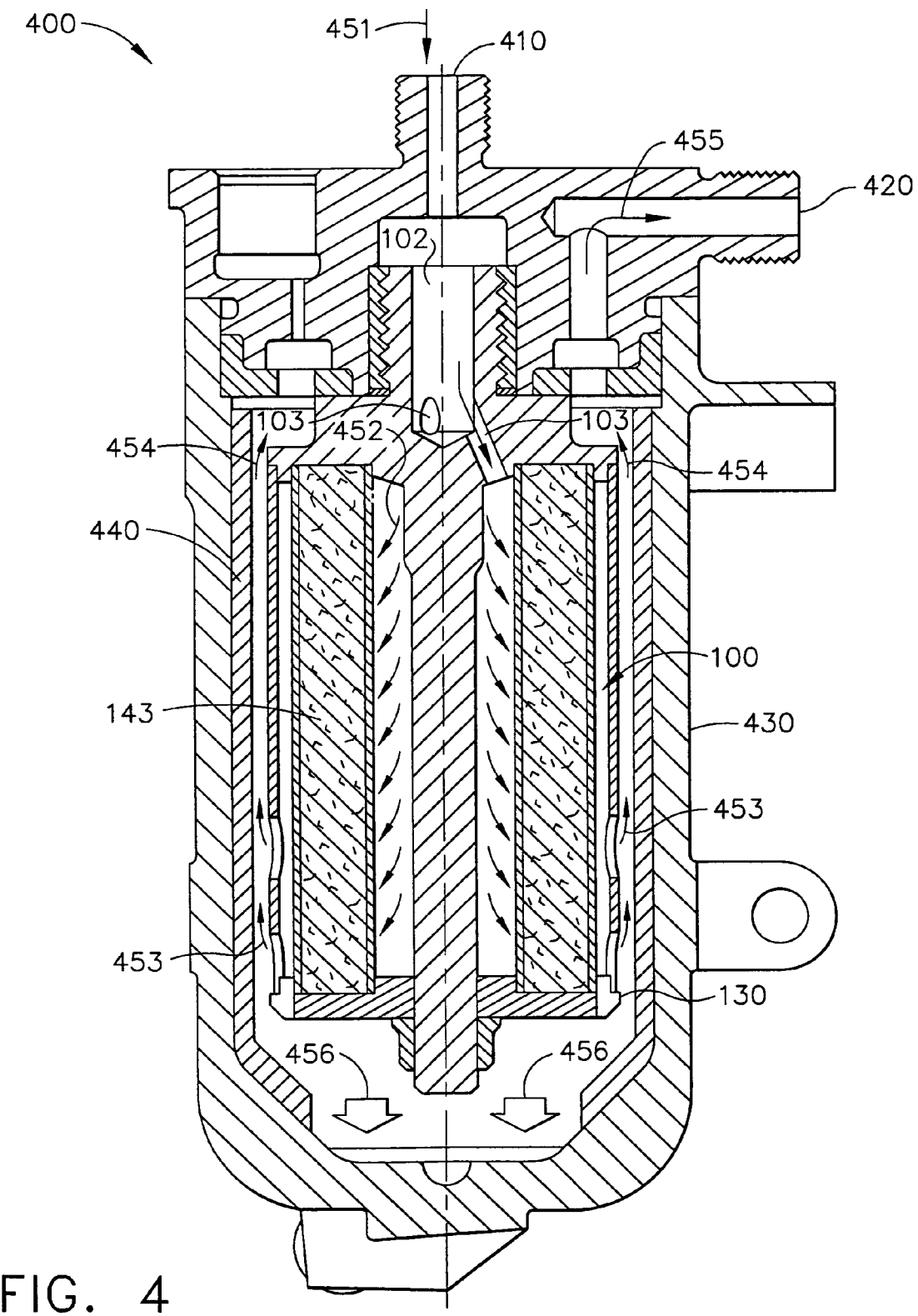
FIG. 4 shows a cross sectional view of an oil separator having oil coalescer installed therein, according to an embodiment of the invention.

FIG. 4 shows an oil separator 400 of which the oil coalescer 100 may be a component. The oil coalescer 100 may be enclosed in an outer shell 430 that has been lined with a heat resistant lining 440. A high velocity, high temperature gas stream, exerting pressures in excess of 5000 psig and having temperatures of 400° F. to 450° F., as indicated by arrow 451, enters the input orifice 410 of the oil separator 400 where it enters chamber 102 and expands, thus losing a portion of its velocity through adiabatic expansion. The gas stream flows through nozzle 103 into the internal cavity 135 of the coalescing assembly 140, as indicated by arrows 452, where it may be forced by the pressure of the gas stream flow through the coalescing element 143. A plurality of nozzles 103, with three equidistantly positioned nozzles being preferred, are located along the lower portion of chamber 102. The nozzles 103 serve to further reduce the velocity of the incoming gas stream by providing multiple entry points to internal cavity 135.

Oil entrained in the gas stream coalesces on the fibers of the coalescing element 143 while the gas stream emerges from the lower holes in the shell 110. From that point, the oil-free gas stream flows upwardly, as indicated by arrows 453, 454, and enters a two-hole diverter before exiting the oil separator, as indicated by arrow 455, via the exit orifice 420. The coalesced oil flows as by gravity out through the bottom cap 130, as indicated by arrows 456 to collect in the lower portion of the outer shell 430, to be returned to the oil sump for the aircraft compressor by the automatic opening of an oil return shuttle valve whenever the oil separator internal pressure drops to approximately 100 psig or less (not shown.)

The inventive oil coalescer has been shown to provide superior performance for the removal of entrained oil from aircraft piston compressor applications. The inventive oil coalescer features support assembly providing the strength and heat resistance of stainless-steel fibers felted into sheets and vacuum sintered to form diffusion bonds between the fibers, resulting in a semi-rigid matrix. The support assembly functions as a pre-filter for removing larger particles from the gas stream and as a support to allow the coalescing element to withstand the pressures and temperatures of the gas stream. The inventive oil coalescer also has a coalescing element providing the high oil removal efficiency of compacted Nomex® felt. This oil coalescer may be used in a unique oil separator with an inventive mechanical design that reduces the inlet flow velocity while providing the optimum oil drain path for more efficient separation of entrained oil from a high velocity, high temperature gas stream. This inventive oil coalescer exhibits the oil removal ultra-efficiency of 97.5% and may be used in applications other than aircraft, where the removal of entrained oils from gas streams is required.

It should be understood, of course, that the foregoing relates to preferred embodiments of the invention and that modifications may be made without departing from the spirit and scope of the invention as set forth in the following claims.

We claim:

1. A coalescing assembly for removing entrained material from a gas stream, the coalescer assembly comprising
    a coalescing element comprised of one or more layers of compacted high temperature polyamide fibers; and
    a support structure for the coalescing element, said support structure comprised of metal fibers felted into sheets and vacuum sintered to form diffusion bonds between the metal fibers, wherein:
    the metal fibers join in a semi-rigid matrix;
    the coalescing element is maintained in a compacted state; and
    the coalescing element is oriented so that the gas stream flows through the coalescing element.

2. The coalescing assembly described in claim 1, wherein the coalescing element is cylindrical, and the support structure comprises a cylindrical inner support structure and a cylindrical outer support structure, the coalescing element being contained between the inner and outer support structures.

3. The coalescing assembly described in claim 1, wherein the metal fibers are comprised of stainless steel.

4. The coalescing assembly described in claim 1, wherein each layer of the coalescing element is comprised of a polyamide having amide groups separated by meta-phenylene groups, whereby the amide groups are attached to the phenyl ring at the 1 and 3 positions.

5. The coalescing assembly described in claim 4, wherein each layer of polyamide fibers has an uncompacted thickness of 0.25".

6. The coalescing assembly described in claim 1, wherein the one or more layers of compacted high temperature polyamide fibers comprise at least three layers of felt.

7. The coalescing assembly described in claim 4, wherein the overall thickness of the one or more layers of compacted polyamide fibers is at least 0.25".

8. An oil coalescer for removing entrained oils from a gas stream, the oil coalescer comprising
    a cylindrical coalescing element comprised of compacted polyamide fibers;
    a support structure comprised of a cylindrical inner support structure and a concentric cylindrical outer support structure enclosing the coalescing element therebetween, the inner support structure defining an internal cavity and the inner support structure allowing fluid communication between the coalescing element and the internal cavity;
    a cylindrical shell enclosing the inner and outer support structures and the coalescing element, the shell having a first row of holes and a second row of holes, the first row of holes and the second row of holes disposed only on a lower portion of the shell and prevent captured oil droplets from being re-entrained in the gas stream:
    a top cap enclosing an upper portion of the cylindrical shell;
    a bottom cap enclosing a the lower portion of the cylindrical shell; and,
    at least one nozzle in fluid communication with the internal cavity, the at least one nozzle directing the gas stream into the internal cavity.

9. The oil coalescer described in claim 8, wherein the polyamide fibers are comprised of a polyamide having amide groups separated by meta-phenylene groups, whereby the amide groups are attached to the phenyl ring at the 1 and 3 positions.

10. The oil coalescer described in claim 8, wherein the second set of holes are disposed partially on the circumference of the shell and partially on the bottom cap to function as drain holes.

11. An oil separator for removing entrained oils from a gas stream and returning the oils to a sump of a compressor, the oil separator comprising
    an oil coalescer, comprising:
        a coalescing element having one or more layers of compacted polyamide or polyimide fibers, and
        a support structure comprising a cylindrical inner support structure and a cylindrical outer support structure, the coalescing element being contained between the inner and outer support structures, wherein the support structure is formed by sintering the metal fibers to form a matrix, wherein:
        the coalescing element is maintained in a compacted state by the inner and outer support structures; and the coalescing element is oriented so that the gas stream flows through the coalescing element;
an input orifice directing the gas stream to an internal cavity of the oil coalescer, wherein the velocity of the entering gas steam is reduced through the use of adiabatic expansion; and
an outer shell enclosing the oil coalescer, a lower portion of the outer shell for collecting oil removed from the gas stream by the oil coalescer;
wherein the oil coalescer includes:
a chamber in fluid communication with the input orifice, and
at least one nozzle in fluid communication between the chamber and the internal cavity.

12. The oil separator described in claim 11, wherein the layers of the coalescing element are made of a polyamide having amide groups separated by meta-phenylene groups, whereby the amide groups are attached to the phenyl ring at the 1 and 3 positions.

13. The oil separator described in claim 11, wherein each layer has an uncompacted thickness of 0.25".

14. The oil separator described in claim 11, wherein the overall thickness of the one or more layers of compacted polyamide or polyimide fibers is at least 0.25".

15. A method for coalescing oil from a gas stream having an aerosol of oil droplets entrained therein, the gas stream flowing through a channel, the method comprising the steps of
reducing a velocity of the gas stream by adiabatic expansion of the gas stream;
directing the gas stream to an oil coalescer comprising a coalescing element supported by a rigid support structure,
directing the gas stream through the coalescing element to remove the entrained oil droplets and to provide a purified gas stream;
collecting the removed oil droplets within the oil coalescer; and
allowing the purified gas stream to flow through the channel, wherein the coalescing element is formed by:
a) providing a layer of fibrous material;
b) compacting the layer of fibrous material to form a layer of compacted fibrous material;
c) heating the compacted material;
d) assembling the layer of heated, compacted fibrous material into a cylindrical assembly;
e) compacting the cylindrical assembly; and
f) heating the compacted cylindrical assembly.

16. The method described in claim 11, wherein the coalescing element is comprised of a felt of compacted polyamide fibers.

17. The method described in claim 16, wherein the polyamide fibers are comprised of amide groups separated by meta-phenylene groups, whereby the amide groups are attached to the phenyl ring at the 1 and 3 positions.

18. The coalescing assembly described in claim 1, wherein the support structure includes an inner support structure and an outer support structure and at least one of the inner support structure and the outer support structure comprises metal fibers.

19. The coalescing assembly described in claim 18, wherein the metal fibers comprise stainless steel.

20. The coalescing assembly described in claim 18, wherein the metal fibers have a length to diameter ratio of 90:1.

21. The oil separator described in claim 11, wherein at least one of the inner and outer support structures comprise stainless steel fibers.

22. The method of claim 15, wherein:
the rigid support structure comprises an inner cylindrical support structure and an outer cylindrical support structure,
the compacted cylindrical assembly is retained between the inner and outer cylindrical support structures, and
the rigid support structure comprises a matrix of metal fibers.

23. The method of claim 15, wherein the coalescing element is further formed by, before step c):
f) heating the layer of compacted fibrous material; and
g) allowing the layer of compacted fibrous material to cool, and wherein the layer of compacted fibrous material comprises polyamide fibers.

24. A method for removing oil droplets from a gas stream, comprising:
a) providing an oil coalescer, said oil coalescer including a coalescing assembly;
b) adiabatically expanding said gas stream within said oil coalescer; and
c) passing said gas stream through said coalescing assembly to provide a purified gas stream, wherein:
said coalescing assembly includes a coalescing element disposed within a metal fiber structure,
said coalescing element comprises at least one layer of compacted polyamide or polyimide fibers,
said metal fiber structure comprises an inner metal fiber structure and an outer metal fiber structure, and
said coalescing element is retained between said inner metal fiber structure and said outer metal fiber structure,
wherein said gas stream exerts a pressure in excess of 5000 psig as said gas stream is passed through said coalescing element in step c).

25. The method of claim 24, wherein:
said oil coalescer comprises a shell disposed between a top cap and a bottom cap,
said outer metal fiber structure is disposed within said shell,
said shell having a shell lower portion adjacent to said bottom cap,
said shell lower portion having a first row of holes and a second row of holes, and
said second row of holes are disposed partially on the circumference of said shell lower portion and partially on said bottom cap.

26. The method of claim 24, wherein said oil coalescer has an oil removal efficiency of at least about 97%.

27. The method of claim 24, wherein said compacted polyamide or polyimide fibers comprise polyamide fibers having amide groups separated by meta-phenylene groups, said amide groups attached to the phenyl ring at the 1 and 3 positions.

28. The method of claim 24, wherein said inner metal fiber structure and said outer metal fiber structure are cylindrical.

29. The method of claim 28, wherein at least one of said inner metal fiber structure and said outer metal fiber structure comprises stainless steel fibers.

30. The method of claim 24, wherein said coalescing element is formed by:
d) providing a layer of fibrous material;
e) compacting said layer of fibrous material to form a layer of compacted fibrous material;

f) assembling said layer of compacted fibrous material into a cylindrical assembly;

g) compacting said cylindrical assembly to provide a compacted cylindrical assembly;

h) heating said compacted cylindrical assembly; and i) disposing said compacted cylindrical assembly between said inner metal fiber structure and said outer metal fiber structure, wherein said compacted cylindrical assembly comprises said at least one layer of compacted polyamide or polyimide fibers.

31. The method of claim 30, wherein:

at least one of said inner metal fiber structure and said outer metal fiber structure comprises a metal fiber matrix, and said metal fiber matrix is formed by:
j) providing raw metal fibers;
k) felting said raw metal fibers into sheets; and
l) vacuum sintering said sheets to form said metal fiber matrix.

32. A method for removing oil droplets from a gas stream, comprising:

a) providing an oil coalescer, said oil coalescer including a coalescing assembly, said coalescing assembly comprising:

inner and outer metal fiber structures, and a coalescing element retained between said inner and outer metal fiber structures, said coalescing element comprising at least one layer of compacted polyamide or polyimide fibers;

b) adiabatically expanding said gas stream within said oil coalescer;

c) thereafter, passing said gas stream through said inner metal fiber structure;

d) thereafter, passing said gas stream through said coalescing element; and e) thereafter, passing said gas stream through said outer metal fiber structure, wherein said oil droplets are removed from said gas stream during said steps c)–e) to provide a purified gas stream, wherein said gas stream exerts a pressure in excess of 5000 psig as said gas stream is passed through said coalescing element in step d).

33. A coalescing assembly for removing entrained material from a gas stream, said coalescer assembly comprising:

a metal fiber structure; and a coalescing element disposed within said metal fiber structure, wherein:

said coalescing element comprises at least one layer of compacted high temperature polyamide or polyimide fibers, and said metal fiber structure comprises an inner metal fiber structure and an outer metal fiber structure, wherein each of said inner and outer metal fiber structures comprises a cylindrical matrix of sintered stainless steel fibers.

* * * * *